(12) United States Patent
Handa

(10) Patent No.: US 6,892,845 B2
(45) Date of Patent: May 17, 2005

(54) TWO-WHEEL DRIVE/FOUR-WHEEL DRIVE SWITCHING SYSTEM FOR A VEHICLE

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/321,697

(22) Filed: Dec. 18, 2002

(65) Prior Publication Data

US 2003/0209378 A1 Nov. 13, 2003

(30) Foreign Application Priority Data

Dec. 26, 2001 (JP) ........................................ 2001-394334

(51) Int. Cl.[7] .............................................. B60K 17/344
(52) U.S. Cl. ..................................... 180/233; 192/54.4
(58) Field of Search ................................ 180/233, 244, 180/247, 249; 192/54.4, 54.52

(56) References Cited

U.S. PATENT DOCUMENTS 6,035,988 A * 3/2000 Ito et al. ..................... 192/82 T
6,101,897 A * 8/2000 Showalter .............. 74/665 GE
2001/0035309 A1 * 11/2001 Seki et al. ................... 180/233
2002/0079178 A1 * 6/2002 Takuno et al. ................ 192/35

FOREIGN PATENT DOCUMENTS

JP  63-151522  *  6/1988
JP  10-53044   *  2/1998

* cited by examiner

Primary Examiner—Anne Marie Boehler
(74) Attorney, Agent, or Firm—Birch, Stewart, Kolasch & Birch, LLP

(57) ABSTRACT

A two-wheel drive/four-wheel drive switching system provided with an electromagnetic coil for connecting or disconnecting a driving shaft and a driven shaft. The accessories connected to the electromagnetic coil of the switching system are provided. The accessories are installed in space formed by faces passing a side edge of a final reduction gear unit, an edge on the side of a switching unit of the final reduction gear unit, an edge on the drive side of the switching unit, and an upper edge of the switching unit. The resulting configuration facilitates the assembly of the accessories connected to the electromagnetic coil.

13 Claims, 10 Drawing Sheets

COMPARATIVE ART

COMPARATIVE ART

COMPARATIVE ART

TWO-WHEEL DRIVE/FOUR-WHEEL DRIVE SWITCHING SYSTEM FOR A VEHICLE

CROSS-REFERENCE TO RELATED APPLICATION

The present application claims priority under 35 U.S.C. § 119 to Japanese Patent Application No. 2001-394334, filed on Dec. 26, 2001, the entire contents of which are hereby incorporated by reference.

BACKGROUND OF THE INVENTION

1. Field of the Invention

The present invention relates to a two-wheel drive/four-wheel drive switching system for a vehicle.

2. Description of Background Art

Heretofore, a vehicle which can switch between two wheel drive and four wheel drive is known.

FIGS. 8 to 10 show an example of the vehicle. The vehicle 1 shown in the drawings is mainly composed of a body frame 3 in the center of which an engine 2 is mounted, front wheels 4 and rear wheels 5 arranged on both sides of the front and the rear of the body frame 3, a steering handlebar 6 arranged on the upside of the front of the body frame 3 for steering the front wheels 4, a fuel tank 7 attached to the body frame 3 and a seat 8 attached in the rear of the fuel tank 7.

As shown in FIG. 9, each front wheel 4 is supported by a suspension 9 provided to both sides of the front of the body frame 3 so that each front wheel can fluctuate. Similarly, each rear wheel 5 is supported by a suspension 10 provided to both sides of the rear of the body frame 3 so that each rear wheel can fluctuate.

A final reduction gear unit for the front wheel 13 and a final reduction gear unit for the rear wheel 14 respectively coupled to the engine 2 via propeller shafts 11, 12 are provided in the center of the front and in the center of the rear of the body frame 3. The right and left front wheels 4 and the right and left rear wheels 5 are connected to the final reduction gear unit for the front wheel 13 and the final reduction gear unit for the rear wheel 14.

A two-wheel drive/four-wheel drive switching system for switching between a rear wheel drive state and a four wheel drive state by connecting or disconnecting power transmitted to the front wheels 4 is provided between the final reduction gear unit for the front wheel 13 and the front propeller shaft 11, for example.

Alternatively, the two-wheel drive/four-wheel drive switching system may be provided between the rear propeller shaft 12 and the final reduction gear unit for the rear wheel 14, in order to switch between a front wheel drive state and a four wheel drive state.

The driving states are suitably switched by a rider according to the condition of a road and the running speed.

FIG. 10 shows the proposed structure of this conventional two-wheel drive/four-wheel drive switching system.

A two-wheel drive/four-wheel drive switching system 15 in FIG. 10 is provided with a switching unit 18 for connecting or disconnecting an output shaft 33 of the final reduction gear unit for the front wheel 13 and the propeller shaft 11.

The switching unit 18 is installed in a casing 37 attached to the final reduction gear unit for the front wheel 13. The switching unit 18 is provided with an inner ring 41 fitted to the output shaft 33 via a spline as a driven shaft, an outer ring 38 supported by the casing 37 via a bearing 39 so that the outer ring can be revolved as a driving shaft, plural connecting/disconnecting members 34 inserted between the outer ring 38 and the inner ring 41 for connecting or disconnecting the outer ring 38 and the inner ring 41, a retainer 46 for holding the plural connecting/disconnecting members 34 so that they can be turned, and a hook plate 19 interlocked with the retainer 46. Also included is an electromagnetic coil 36 attached to the casing 37 around the output shaft 33 and a rotor 20 provided around the electromagnetic coil 36 and integrated with the outer ring 38. The switching unit connects the outer ring 38 and the inner ring 41 via the connecting/disconnecting members 34 by rotational resistance when the electromagnetic coil 36 attracts the hook plate 19 to the rotor 20.

An energizing cable 27 for supplying driving current is connected to the electromagnetic coil 36, pierces the side wall of the casing 37, and is led outside and is connected to a control unit 28 installed in a vehicle 1. FIG. 10 also shows a power source 29.

The two-wheel-drive/four-wheel drive switching system 15 configured as described above attracts the hook plate 19 to the rotor 20 by turning on the electromagnetic coil 36, connects the inner ring 41 and the outer ring 38 via the connecting/disconnecting members 34 by rotational resistance caused at that time. As a result, the propeller shaft 11 and the output shaft 33 are connected by connecting the outer ring 38 and the inner ring 41, thus transmitting the revolution of the engine 2 to the final reduction gear unit for the front wheel 13, and turning a two wheel drive state to a four wheel drive state.

Conversely, the switching unit disconnects the inner ring 41 and the outer ring 38 by disconnecting energizing to the electromagnetic coil 36 and releasing attraction for the hook plate 19, disconnects the transmission of power to the final reduction gear unit for the front wheel 13, thus turning a four wheel drive state to a two wheel drive state by only the rear wheels.

Such a conventional type two-wheel drive/four-wheel drive switching system 15 has the following problems to be improved.

Specifically, the energizing cable 27 for supplying driving current to the electromagnetic coil 36 is led outside the casing 37. Likewise, a coupler connected to control unit 28 is outside of the casing 37. The energizing cable 27 and the coupler compose accessories.

As the energizing cable 27 remains led outside the casing 37, work for fixing the accessories such as wiring and fixing the energizing cable 27 and fixing the coupler attached to the energizing cable 27 is required after the two-wheel drive/four-wheel drive switching system 15 is attached to the final reduction gear unit for the front wheel 13 and the work is troublesome.

Other components of vehicle 1 exist around the two-wheel drive/four-wheel drive switching system 15. These components include, for example, a tie rod and a pitman arm, respectively forming a steering mechanism arranged close around the final reduction gear unit for the front wheel 13. As a result, the position in which the energizing cable 27 is wired and fixed is restricted by these components.

SUMMARY AND OBJECT OF THE INVENTION

The present invention is made in view of such problems of the conventional system described above, and has the object of providing a two-wheel drive/four-wheel drive switching system for a vehicle in which it is easy to attach the accessories connected to an electromagnetic coil forming a part of the switching system.

According to a first aspect of the present invention, a two-wheel drive/four-wheel drive switching system for a vehicle includes a switching unit provided to either of final reduction gear units provided between an engine and a front wheel and between the engine and a rear wheel for connecting or disconnecting the transmission of power between the final reduction gear unit. The engine is provided with a driving shaft coupled to the drive side, a driven shaft fitted to the driving shaft via circular clearance, an electromagnetic clutch inserted into the clearance between the driving shaft and the driven shaft for connecting or disconnecting the driving shaft and the driven shaft, and an electromagnetic coil for operating the electromagnetic clutch and accessories connected to the electromagnetic coil. In addition, the accessories are installed in a space formed by faces passing the side edge of the final reduction gear unit, the edge on the side of the switching unit of the final reduction gear unit, the edge on the drive side of the switching unit and the upper edge of the switching unit.

According to a second aspect of the present invention, the switching unit is installed in a casing attached to the final reduction gear unit, and the accessories are attached to the casing.

According to a third aspect of the present invention, the accessories of the switching system are attached to a stay, which in turn, is attached to the casing.

According to a fourth aspect of the present invention, a speed sensor for detecting the revolution of the driving shaft is attached to the stay.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
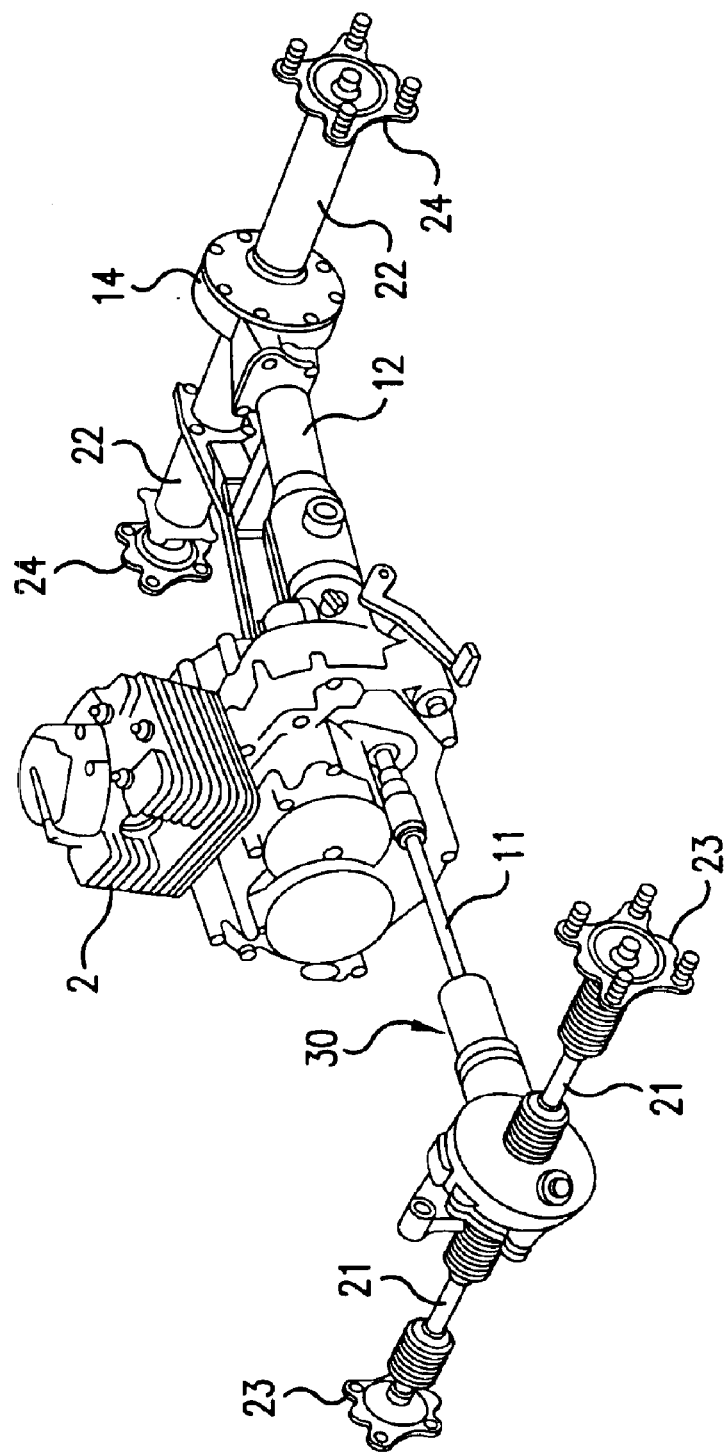
FIG. 1 shows one embodiment of the invention and is a schematic block diagram showing a power transmission system of a vehicle.

Referring to FIGS. 1 to 7, one embodiment of the invention will be described below.

In the following description, as a primary component of a vehicle is common in FIGS. 5 and 6, the same reference number is used to simplify the description.

A two-wheel drive/four-wheel drive switching system 30 equivalent to this embodiment is provided to the side of a final reduction gear unit for a front wheel 13 of the final reduction gear unit for the front wheel 13. Further, as shown in FIGS. 1 and 2, a final reduction gear unit for a rear wheel 14 arranged before and after an engine 2 is provided between a propeller shaft 11 extended ahead of the engine 2 and the final reduction gear unit for the front wheel 13 and is integrated with the final reduction gear unit for the front wheel 13.

Figure 2:
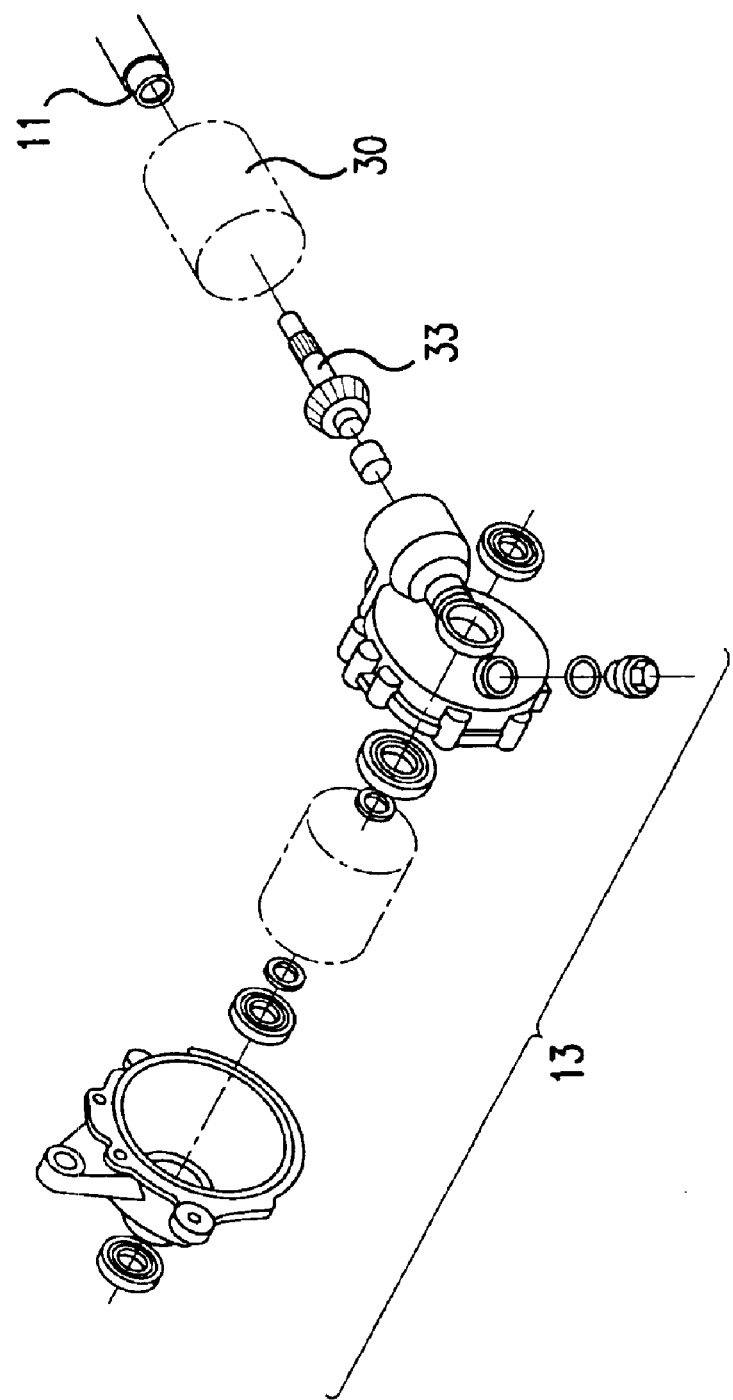
FIG. 2 shows one embodiment of the invention and is an exploded perspective view showing a main part.

FIG. 1 shows a pair of right and left drive shafts 21 coupled to the final reduction gear unit for the front wheel 13, a pair of right and left axle housings 22 which are coupled to the final reduction gear unit for the rear wheel 14 and into which a drive shaft for a rear wheel is inserted. Further, wheel hubs 23 and 24, to which a front wheel 4 and a rear wheel 5 are attached, are provided to the ends of each drive shaft 21 and each axle housing 22.

Figure 3:
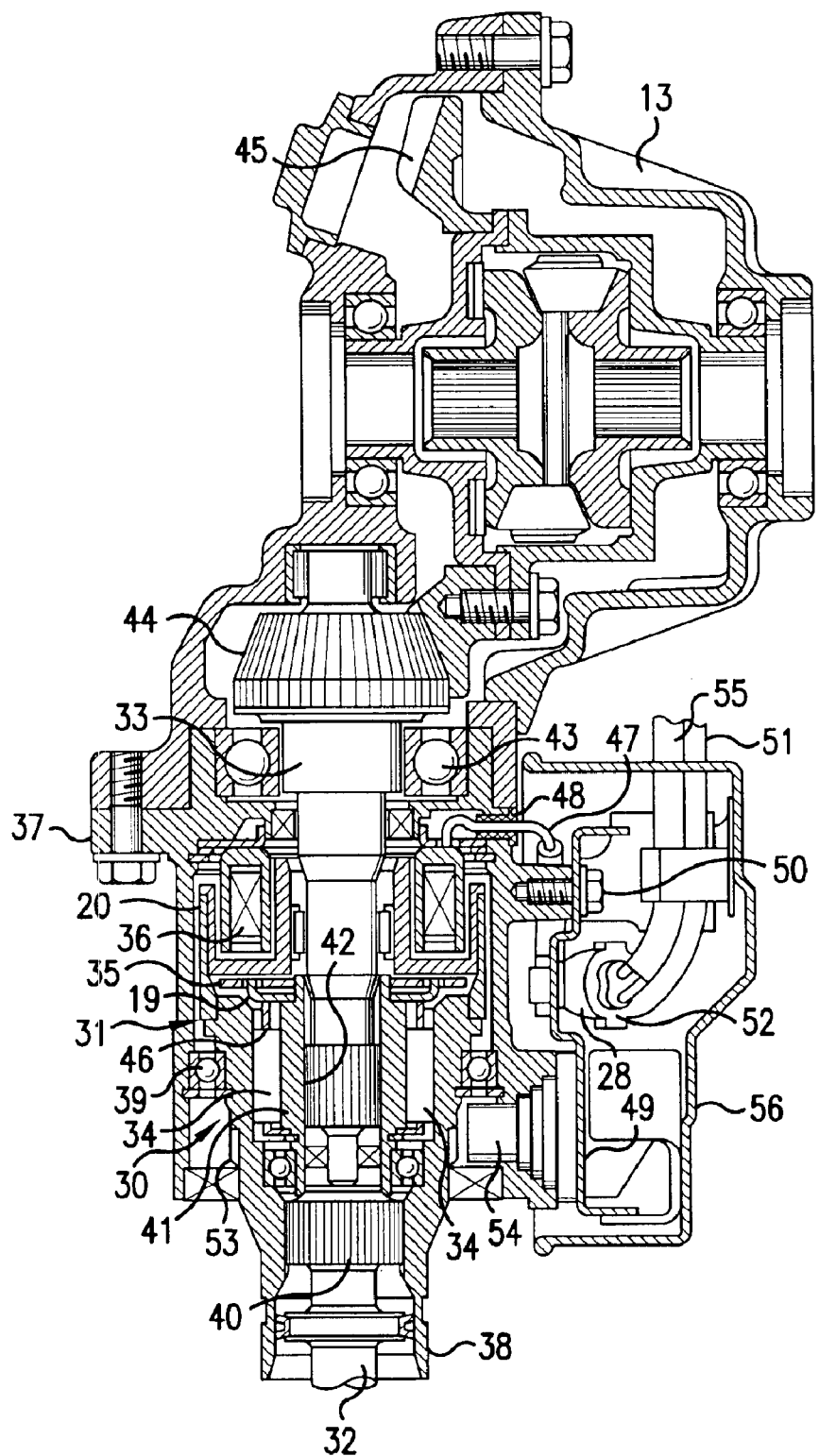
FIG. 3 is a longitudinal sectional view showing the main part in one embodiment of the invention.

The two-wheel drive/four-wheel drive switching system (hereinafter abbreviated as the drive switching system) 30 is provided to a power transmission mechanism provided between the front wheel 4 and the engine 2 as described above. As shown in FIG. 3, the drive switching system includes a casing 37 integrated with the final reduction gear unit for the front wheel 13 and a switching unit 31 installed in the casing 37 for connecting or disconnecting power transmission in the power transmission mechanism. The switching unit 31 is provided with an outer ring 38 as a driving shaft coupled to the drive side, an inner ring 41 as a driven shaft fitted to the outer ring 38 via circular clearance, plural connecting/disconnecting members 34 each of which is inserted into clearance between the outer ring 38 and the inner ring 41 for connecting or disconnecting the outer ring 38 and the inner ring 41 by fitting or extracting each member between/from between the opposite faces of these rings, and a retainer 46 for holding these connecting/disconnecting members 34 so that they can be turned. The switching unit 31 also includes a hook plate 19 interlocked with the retainer 46, an electromagnetic coil 36 attached to the casing 37 around an output shaft 33 coupled to the inner ring 41 via a spline 42 so that the output shaft can be integrally revolved, a rotor 20 integrated with the outer ring 38 around the electromagnetic coil 36 and an armature plate 35 attached to the inner ring 41 opposite to the rotor 20.

As further explanation of this embodiment, the outer ring 38 is attached to the casing 37 via a bearing 39 so that the outer ring can be revolved, a spline 40 is formed on the inner face of the end on the side of the engine of the outer ring 38 and the propeller shaft 11 is inserted into the outer ring 38 so that the propeller shaft is engaged with the spline 40.

The inner ring 41 has a cross section that is a polygon in shape and is arranged inside the outer ring 38 via a circular interval having predetermined width between the inner ring and the inner face of the outer ring 38.

The spline 42 is formed on the inner face of the inner ring 41 and the output shaft 33 inserted into the casing 37 is coupled to the inner ring 41 via the spline 42.

An intermediate part in a longitudinal direction of the output shaft 33 is supported by a bearing 43 attached to the casing 37 so that the output shaft can revolve.

A pinion gear 44 is integrated with the end of the output shaft 33 and is engaged with a ring gear 45 of the final reduction gear unit for the front wheel 13.

Figure 5A:
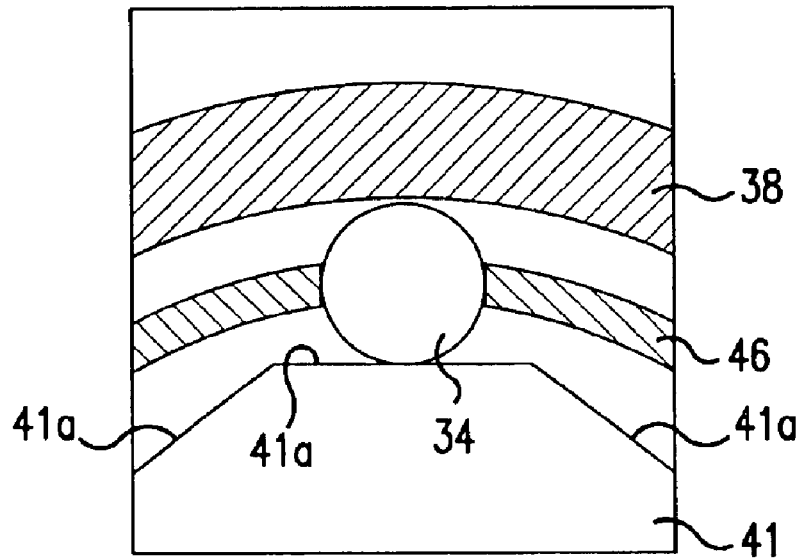
FIGS. 5(a) and (b) show one embodiment of the invention and are enlarged sectional views showing the main part for explaining the operation of a drive switching system.
Figure 5B:
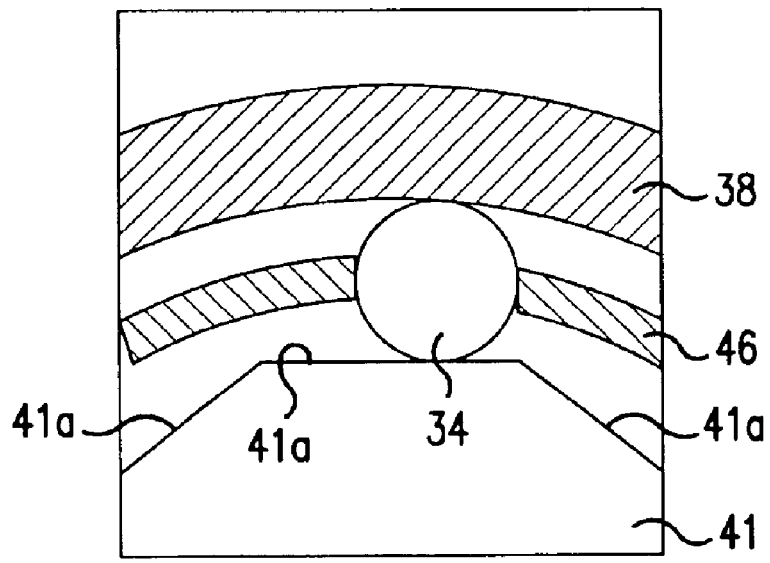
Figure 6:
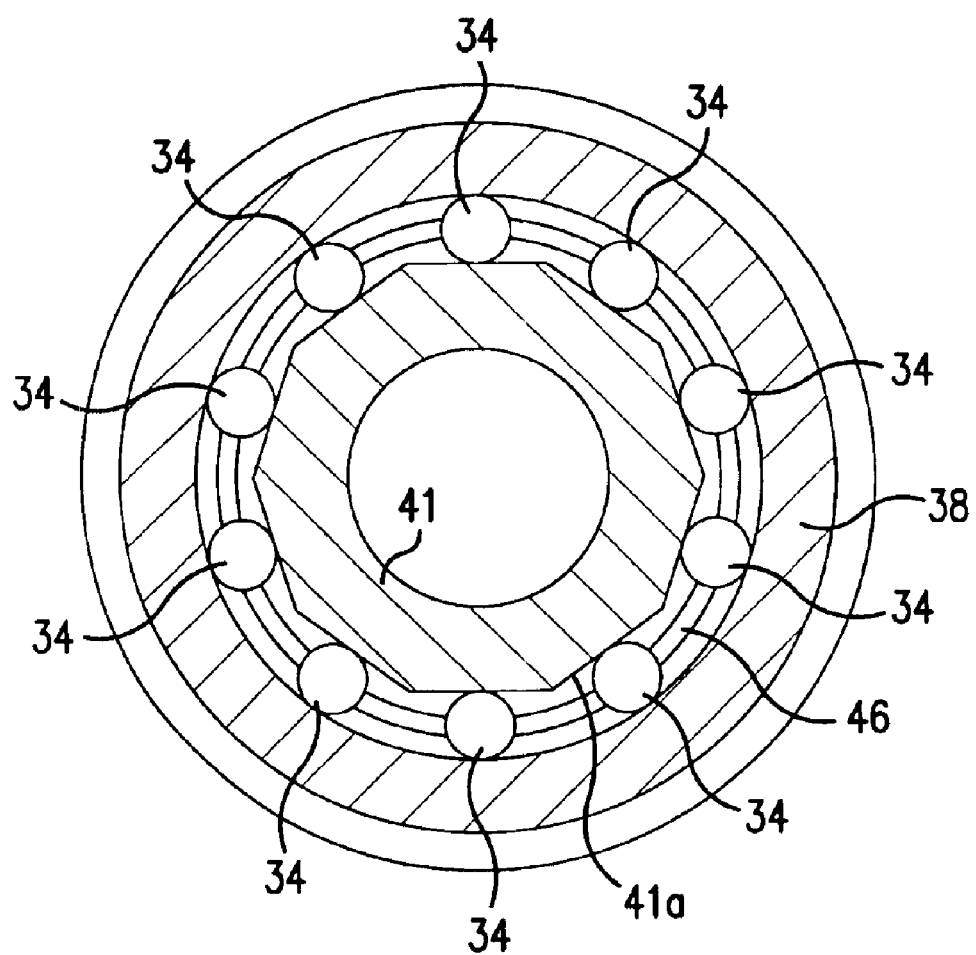
FIG. 6 is a sectional view for explaining the action of connecting/disconnecting members in one embodiment of the invention.

The connecting/disconnecting members 34 forming a part of the switching unit 31 are formed by plural rollers arranged in parallel to the axis of the outer ring 38 as shown in FIGS. 3, 5A and 5B. The connecting/disconnecting members 34 are supported by the retainer 46 attached to the outer ring 38 so that the retainer can be relatively turned (can be relatively moved along the axis).

A cam face 41a for moving the connecting/disconnecting members 34 in a radial direction according to relative movement between the inner ring and the retainer 46 is formed on the surface of the inner ring 41.

An odd number of the connecting/disconnecting members 34 are normally provided. In this embodiment, nine connecting/disconnecting members 34 are provided. Similarly, nine cam faces 41a formed on the inner ring 41 are provided.

The hook plate 19 interlocked with the retainer 46 is attracted on the side of the rotor 20 by the electromagnetic coil 36, rotational resistance is caused between the hook plate 19 and the rotor 20 and restricts relative movement between the retainer 46 and the outer ring 38.

Further, in this embodiment, as shown in FIG. 3, a through hole into which an energizing cable 47 connected to the electromagnetic coil 36 is inserted is formed on the side wall of the casing 37 and the energizing cable 47 is inserted into the through hole via a grommet 48 attached to the through hole.

A stay 49 is attached to the outside face of the side in a direction of the width of a vehicle 1 of the casing 37 by a bolt 50.

A coupler 52 for connecting the energizing cable 47 and an energizing cable 51 connected to a control unit 28 is attached to the stay 49, and the energizing cable 47 and the coupler 52 compose accessories of the electromagnetic coil 36.

Figure 4:
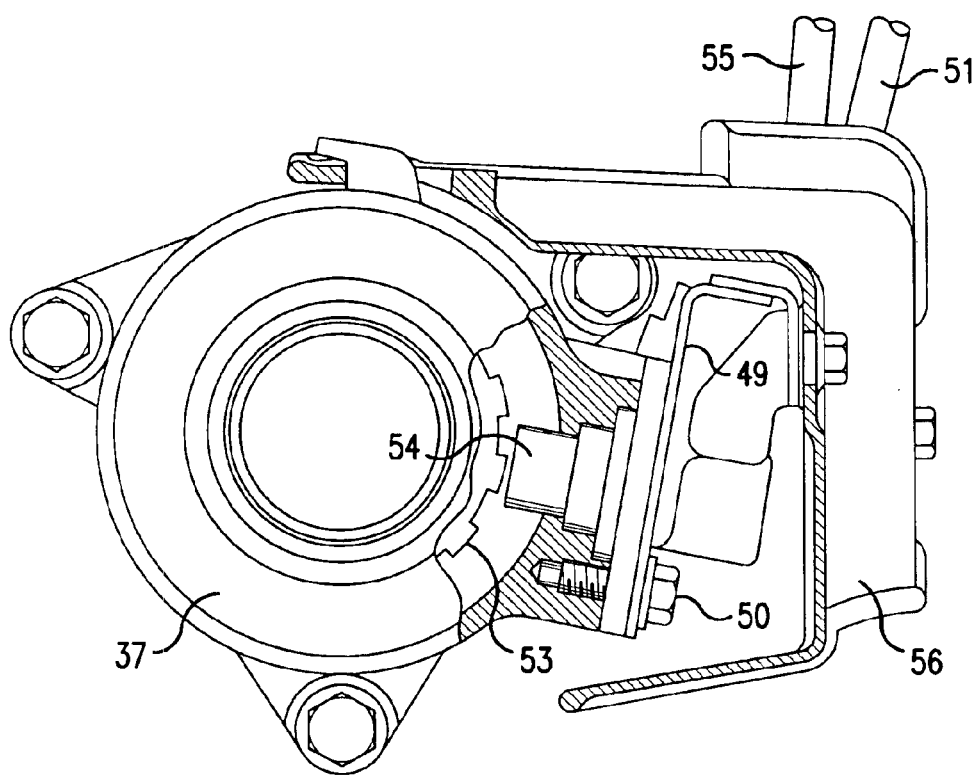
FIG. 4 shows one embodiment of the invention and shows a part viewed from the rear of the vehicle of the main part.

Further, a speed sensor 54 inserted into the casing 37 for detecting the number of revolutions and the revolution speed of the outer ring 38 by detecting a spline 53 formed on the periphery of the outer ring 38 is attached to the stay 49 as shown in FIGS. 3 and 4 and is connected to a signal line 55 connected to the control unit 28 via the coupler 52.

A cover 56 covering the grommet 48, the coupler 52 and the speed sensor 54 is attached to the stay 49.

Figure 7A:
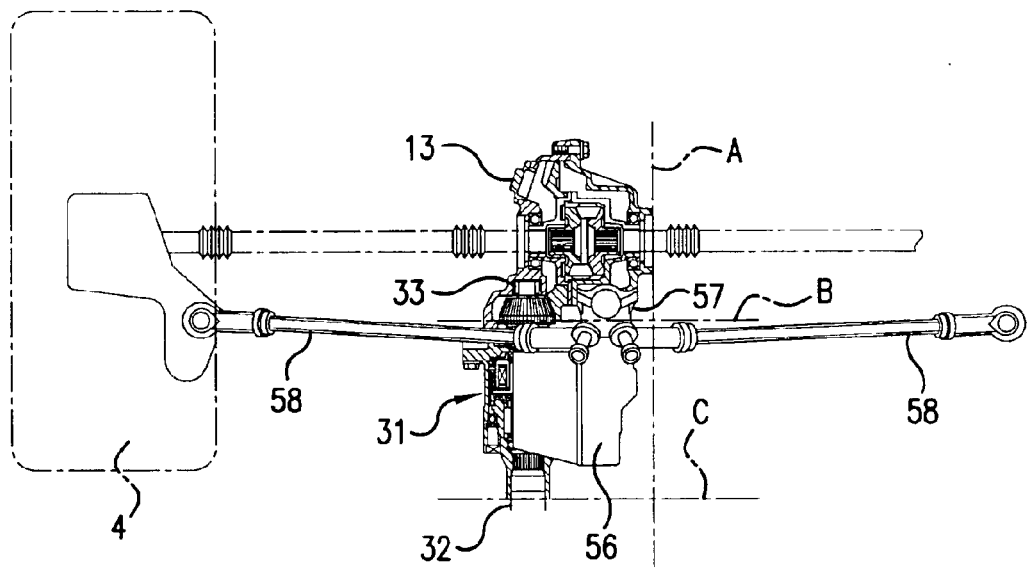
FIGS. 7(a) and (b) show one embodiment of the invention and show positional relation between accessories and other components.
Figure 7B:
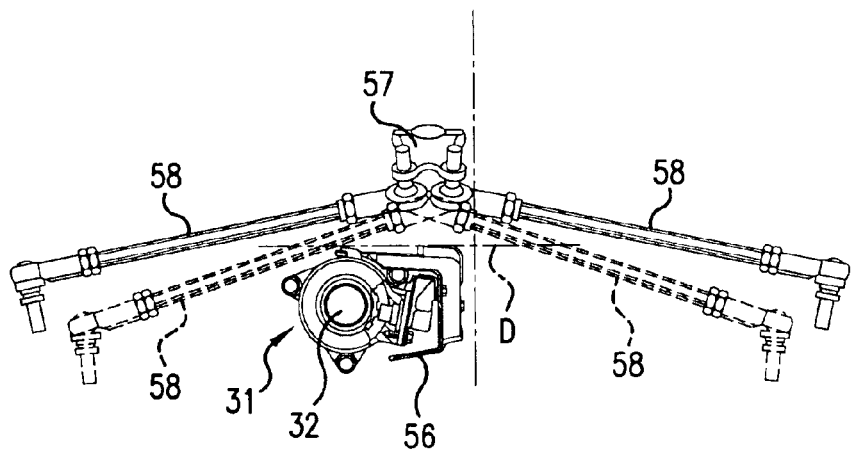
Figure 8:
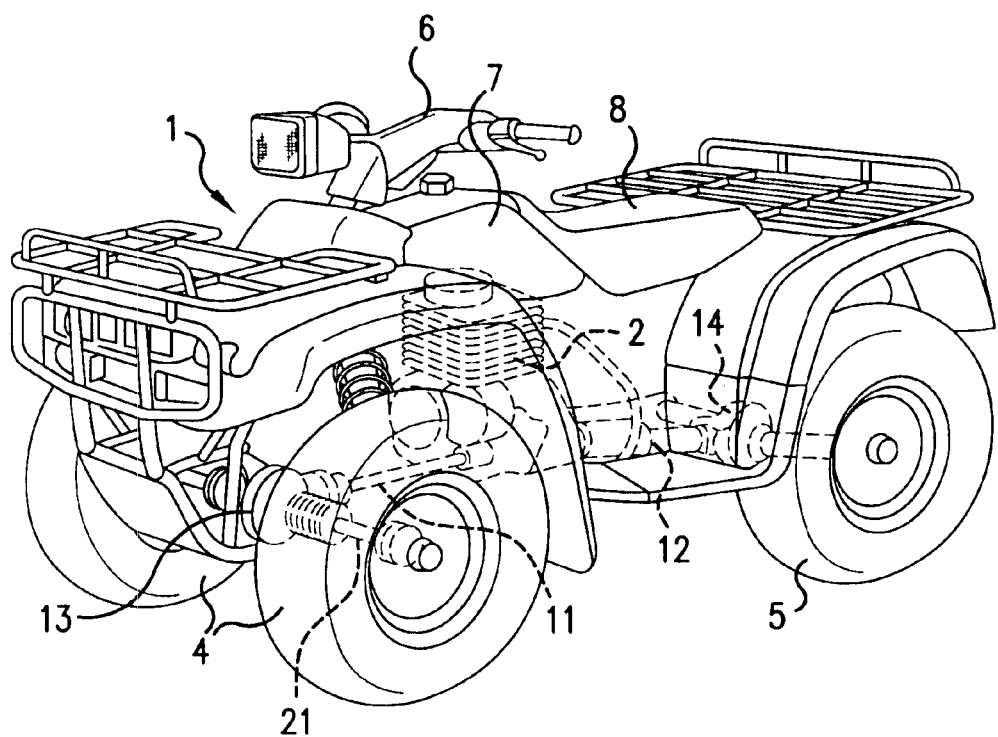
FIG. 8 is an outside perspective view showing one example of a vehicle provided with a conventional type two-wheel drive/four-wheel drive switching system.
Figure 9:
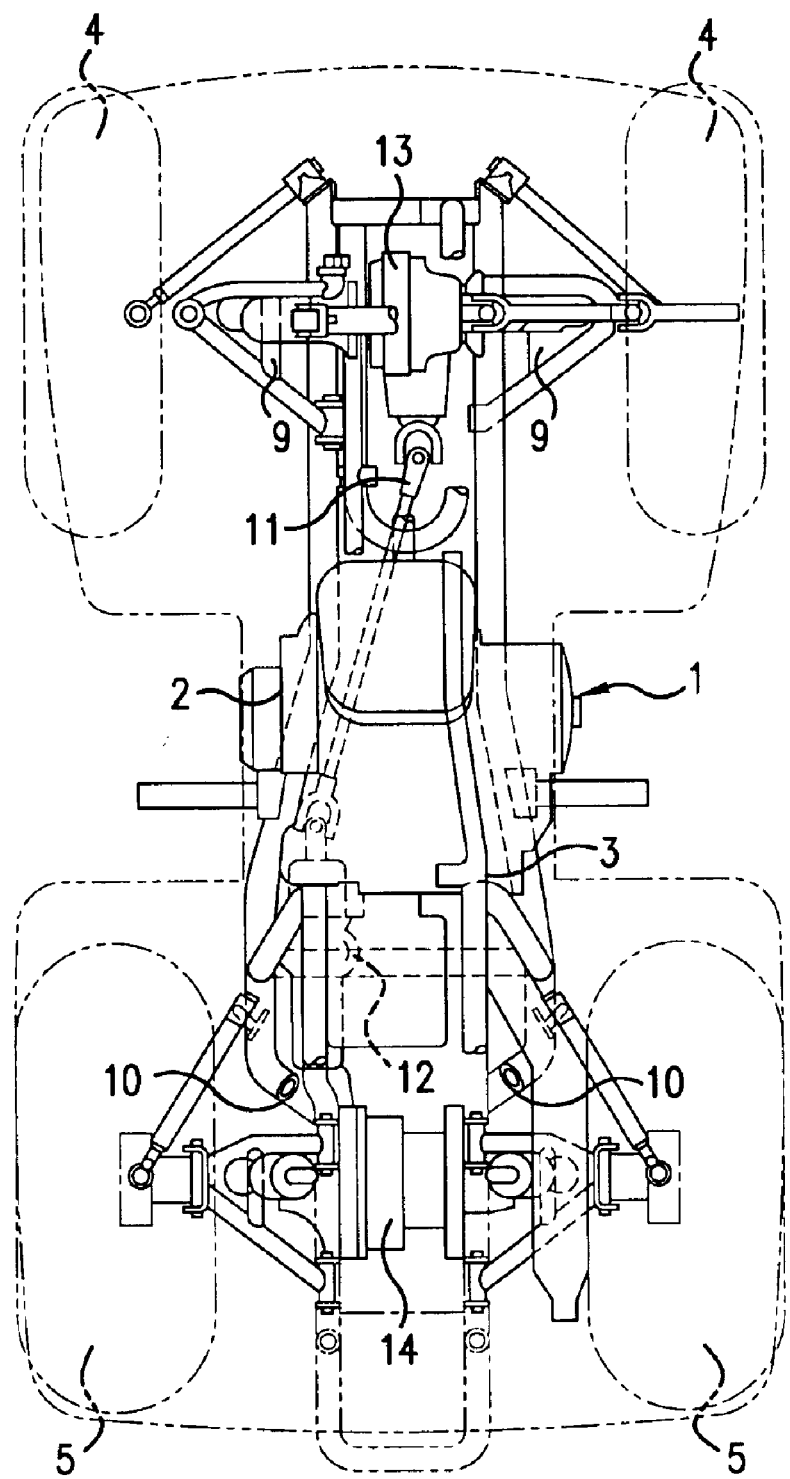
FIG. 9 is a plan for explaining the configuration of the vehicle shown in FIG. 8.
Figure 10:
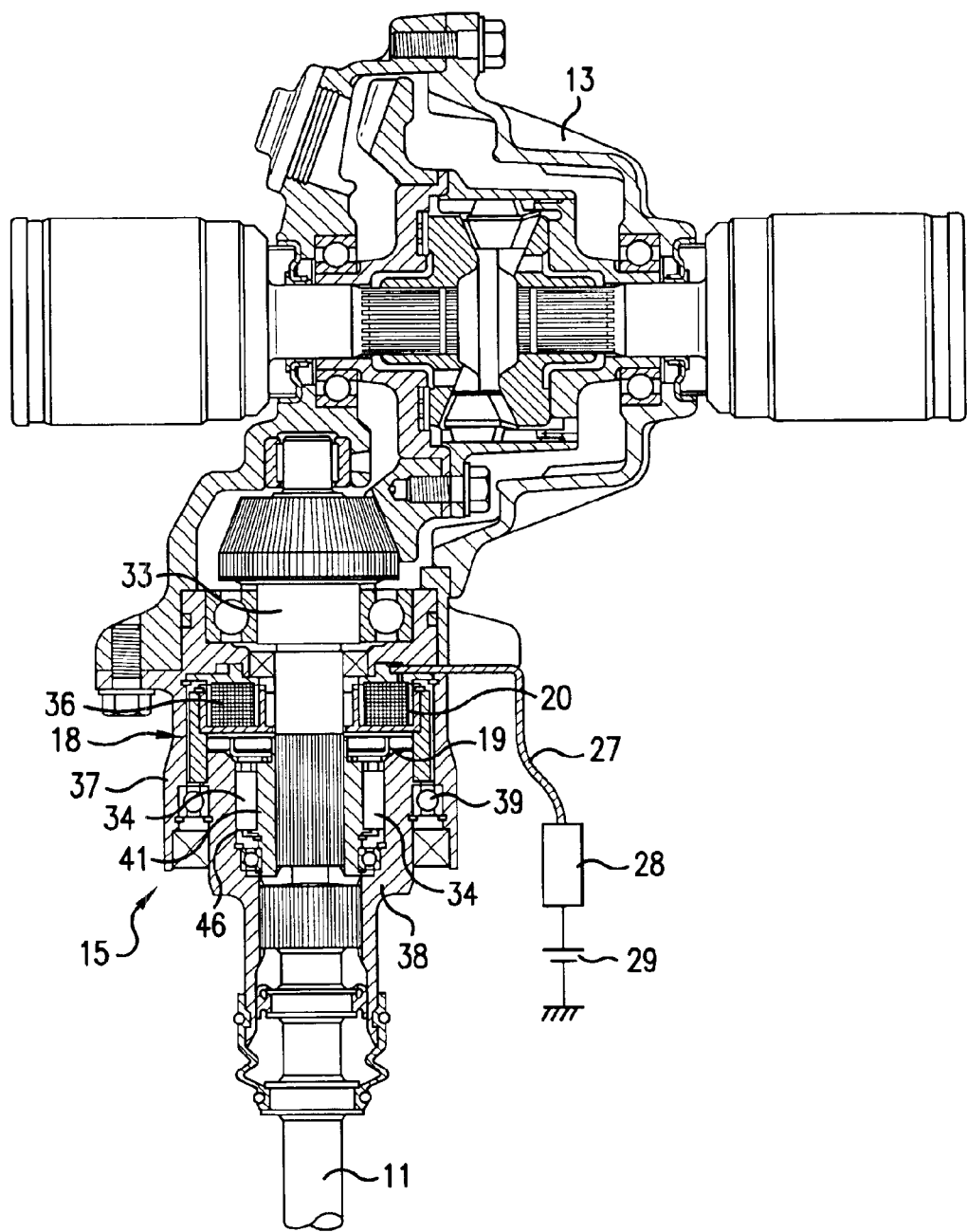
FIG. 10 is a sectional view showing a main part of one structural example of the two-wheel drive/four-wheel drive switching system disclosed in a prior application.

As shown by chain lines A, B, C, D in FIGS. 7A and 7B, the stay 49 and the cover 56 are installed in space formed by faces passing the side edge of the final reduction gear unit for the front wheel 13, the edge on the side of the switching unit 31 of the final reduction gear unit for the front wheel 13, the edge on the drive side of the switching unit 31 and the upper edge of the switching unit 31.

FIGS. 7 (a) and (b) show a pitman arm 57 forming a steering system and a tie rod 58 for coupling the pitman arm 57 and an axle housing 22 where the front wheel 4 is installed.

In the drive switching system 30 of the embodiment described above, the stay 49 and the cover 56 are installed in the space formed by faces passing the side edge of the final reduction gear unit 13, the edge on the side of the switching unit 31 of the final reduction gear unit 13, the edge on the drive side of the switching unit 31 and the upper edge of the switching unit 31. In the space, the accessories of the electromagnetic coil 36, such as the energizing cable 47 and the coupler 52 respectively attached to the stay 49, are efficiently and effectively installed. This is possible because the space is positioned such that the accessories do not interfere with other components of the vehicle 1, such as the pitman arm 57 and the tie rod 58.

Therefore, the internal space of the vehicle 1 can be effectively utilized.

As the accessories of the electromagnetic coil 36 such as the energizing cable 47 and the coupler 52 are assembled in the casing 37 beforehand, and can be attached to the reduction gear unit for the front wheel 13 together with the casing 37, assembly is greatly simplified.

As shown in FIG. 5(a), to disconnect the transmission of driving force to the front wheel 4, when energy to the electromagnetic coil 36 is disconnected, fixing between the retainer 46 and the outer ring 38 is released. The connecting/disconnecting members 34 are located at the bottom of the cam face 41a and are held in a position apart from the outer ring 38.

As a result, the outer ring 38 and the inner ring 41 are disconnected, the revolution of a driving shaft 32 is prevented from being transmitted to the driven shaft 33 and the transmission of driving force to the front wheel 4 is released.

Conversely, as shown in FIG. 5(b), to enable four wheel drive, the electromagnetic coil 36 is energized, the hook plate 19 is attracted on the side of the rotor 20 and the retainer 46 is fixed to the outer ring 38 utilizing rotational resistance caused between the rotor 20 and the hook plate 19 (the armature plate 35) at this time.

As a result, the connecting/disconnecting members 34 held by the retainer 46 move together with the outer ring 38, move at the top of the cam face 41a formed on the inner ring 41, and touch the inner face of the outer ring 38.

As a result, the outer ring 38 and the inner ring 41 are coupled via the connecting/disconnecting members 34, causing the driving shaft 32 and the driven shaft 33 to be coupled, and causing the revolution of the driving shaft 32 to be transmitted to the driven shaft 33. As a result, transmission of the driving force to the front wheel 4 is started.

The shape and the dimensions of each component described in the embodiment are one example and can be variously varied according to requirements of design.

As described above, according to the invention, since the accessories of the electromagnetic coil are installed in the space formed by faces passing the side edge of the final reduction gear unit 13, the edge on the side of the switching unit 31 of the final reduction gear unit 13, the edge on the drive side of the switching unit 31 and the upper edge of the switching unit, the accessories can be installed in a position so that they do not interfere with other components of the vehicle, and the internal space of the vehicle can be efficiently utilized.

Since the accessories are assembled in the casing beforehand, and can be attached to the final reduction gear unit for the front wheel together with the casing, the assembly is greatly simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel drive/four-wheel drive switching system for a vehicle, comprising:
a switching unit installed in a casing provided on one of two final reduction gear units provided between an engine and a front wheel and between the engine and a rear wheel, said switching unit being capable of connecting or disconnecting a transmission of power between the one of the two final reduction gear units and the engine, wherein said switching unit includes:
a driving shaft connected to a drive side of said switching unit;
a driven shaft fitted to the driving shaft via a circular clearance;
an electromagnetic clutch inserted in the circular clearance between the driving shaft and the driven shaft for connecting or disconnecting the driving shaft and the driven shaft;
an electromagnetic coil for operating the electromagnetic clutch;
accessories connected to the electromagnetic coil; and
a speed sensor inserted into the casing for detecting a number of revolutions of the driving shaft,
a stay mounted on the casing, the accessories and the speed sensor being attached to the stay.

2. The two-wheel drive/four-wheel drive switching system for a vehicle according to claim 1, wherein the stay is attached to the casing with a bolt.

3. The two-wheel drive/four-wheel drive switching system for a vehicle according to claim 1, further including a cover attached to the stay.

4. The two-wheel drive/four-wheel drive switching system for a vehicle according to claim 3, wherein the stay and the cover are installed in a space formed by faces passing a side edge of the final reduction gear unit for the front wheel, an edge on a side of the switching unit of the final reduction gear unit for the front wheel, an edge on a drive side of the switching unit, and an upper edge of the switching unit.

5. The two-wheel drive/four-wheel drive switching system for a vehicle according to claim 1, wherein the accessories are pre-assembled in the casing prior to attaching the switching unit to the one of the two final reduction gear units.

6. A two-wheel drive/four-wheel drive switching system for a vehicle, comprising:
a switching unit installed in a casing provided on a front one of two final reduction gear units provided between an engine and a front wheel and between the engine and a rear wheel, said switching unit for connecting or disconnecting a transmission of power between the front final reduction gear unit and the engine, wherein said switching unit includes:
a driving shaft connected to a drive side of said switching unit;
a driven shaft fitted to the driving shaft via a circular clearance;
an electromagnetic clutch inserted in the circular clearance between the driving shaft and the driven shaft for connecting or disconnecting the driving shaft and the driven shaft;
an electromagnetic coil for operating the electromagnetic clutch; and
an energizing cable connected to the electromagnetic coil, the energizing cable being arranged on a rear side of the front final reduction gear unit,
wherein the energizing cable and a coupler are pre-assembled in the casing prior to attaching the switching unit to the front final reduction gear unit.

7. The two-wheel drive/four-wheel drive switching system for a vehicle according to claim 6, wherein:
the energizing cable is attached to a stay attached to the casing.

8. The two-wheel drive/four-wheel drive switching system for a vehicle according to claim 7, wherein:
a speed sensor for detecting the revolution of the driving shaft is attached to the stay.

9. The two-wheel drive/four-wheel drive switching system for a vehicle according to claim 7, wherein the stay is attached to the casing with a bolt.

10. The two-wheel drive/four-wheel drive switching system for a vehicle according to claim 7, further including a cover attached to the stay.

11. The two-wheel drive/four-wheel drive switching system for a vehicle according to claim 10, wherein the stay and the cover are installed in a space formed by faces passing a side edge of the front final reduction gear unit, an edge on a side of the switching unit of the front final reduction gear unit, an edge on a drive side of the switching unit and an upper edge of the switching unit.

12. The two-wheel drive/four-wheel drive switching system for a vehicle according to claim 6, wherein the energizing cable passes through a grommet in the casing and extends to the electromagnetic coil.

13. A two-wheel drive/four-wheel drive switching system for a vehicle, comprising:
a switching unit installed in a casing provided on a front one of two final reduction gear units provided between an engine and a front wheel and between the engine and a rear wheel, said switching unit for connecting or disconnecting a transmission of power between the front final reduction gear unit and the engine, wherein said switching unit includes:
a driving shaft connected to a drive side of said switching unit;
a driven shaft fitted to the driving shaft via a circular clearance;
an electromagnetic clutch inserted in the circular clearance between the driving shaft and the driven shaft for connecting or disconnecting the driving shaft and the driven shaft;
an electromagnetic coil for operating the electromagnetic clutch;
an energizing cable connected to the electromagnetic coil;
a stay with a cover attached to the casing, the stay installed in a space formed by faces passing a side edge of the front final reduction gear unit, an edge on a side of the switching unit of the front final reduction gear unit, an edge on a drive side of the switching unit and an upper edge of the switching unit,
wherein the energizing cable is attached to a stay so as to be arranged on a rear side of the front final reduction gear unit.

* * * * *